(12) United States Patent
Hetzler et al.

(10) Patent No.: US 8,214,684 B2
(45) Date of Patent: Jul. 3, 2012

(54) INCOMPLETE WRITE PROTECTION FOR DISK ARRAY

(75) Inventors: Steven R. Hetzler, Los Altos, CA (US); Daniel F. Smith, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1129 days.

(21) Appl. No.: 12/059,011

(22) Filed: Mar. 31, 2008

(65) Prior Publication Data

US 2008/0276146 A1  Nov. 6, 2008

Related U.S. Application Data

(63) Continuation of application No. 11/744,273, filed on May 4, 2007, now abandoned.

(51) Int. Cl.
*G06F 11/00* (2006.01)

(52) U.S. Cl. ........................ 714/6.24; 711/114

(58) Field of Classification Search .......... 714/5.1, 714/5.11, 6.1, 6.11, 6.12, 6.13, 6.2–6.32, 714/10–13, 702, 763, 765; 711/100, 114
See application file for complete search history.

(56) References Cited

U.S. PATENT DOCUMENTS

| | | |
|---|---|---|
| 5,533,190 A | 7/1996 | Binford et al. |
| 6,105,103 A | 8/2000 | Courtright, II et al. |
| 6,609,176 B1 | 8/2003 | Mizuno |
| 6,721,863 B1 | 4/2004 | Endo |
| 6,891,694 B2 | 5/2005 | Hetzler et al. |
| 7,010,645 B2 | 3/2006 | Hetzler et al. |
| 7,076,606 B2 | 7/2006 | Orsley |
| 7,096,316 B1 * | 8/2006 | Karr et al. ............... 711/114 |
| 7,457,980 B2 | 11/2008 | Yang et al. |
| 2002/0091903 A1 | 7/2002 | Mizuno |
| 2003/0105928 A1 | 6/2003 | Ash et al. |
| 2004/0059869 A1 | 3/2004 | Orsley |
| 2005/0125586 A1 | 6/2005 | McCarty et al. |
| 2006/0036901 A1 | 2/2006 | Yang et al. |
| 2006/0041718 A1 | 2/2006 | Ulrich et al. |
| 2006/0206665 A1 | 9/2006 | Orsley |

OTHER PUBLICATIONS

USPTO Communication, U.S. Appl. No. 11/744,273, Sep. 8, 2009, 14 pages.

* cited by examiner

*Primary Examiner* — Dieu-Minh Le
(74) *Attorney, Agent, or Firm* — Gibb I.P. Law Firm, LLC (57) ABSTRACT

The embodiments of the invention provide methods of protecting data blocks while writing to a storage array, wherein storage units in the storage array include write logs. The data protection level of the write logs is equal to or greater than the data protection level of the storage units. Moreover, the write logs have metadata describing contents of the write logs, wherein the metadata include a sequence number identifying the age of the metadata. Each of the data blocks is a member of a parity group having addressable data blocks and first parity blocks. The addressable data blocks have at least one host data block and at least one associated data block.

17 Claims, 5 Drawing Sheets

| $A_1$ | $B_1$ | $C_1$ | $P_{111}$ |

FIG. 1A

| $A_2$ | $B_1$ | $C_1$ | $P_{211}$ |

FIG. 1B

| $A_1$ | $B_1$ | $C_1$ | $P_{111}$ | $Q_{111}$ | $R_{111}$ |

FIG. 2A

| $A_2$ | $B_1$ | $C_1$ | $P_{111}$ | $Q_{211}$ | $R_{111}$ |

INCOMPLETE WRITE PROTECTION FOR DISK ARRAY

CROSS-REFERENCE TO RELATED APPLICATIONS

This application is a continuation of U.S. application Ser. No. 11/744,273 filed May 4, 2007, now abandoned, the complete disclosure of which, in its entirety, is herein incorporated by reference.

BACKGROUND

1. Field of the Invention

The embodiments of the invention provide methods, systems, computer program products, etc. for incomplete write protection for a disk array.

2. Description of the Related Art

Software redundant array of independent (or inexpensive) disks (RAID) is becoming more popular. Recent desktop PC chipsets support various software RAID designs, such as RAID 5. However, battery backed cache is not generally available in motherboards based on these chipsets.

Figure 1A:
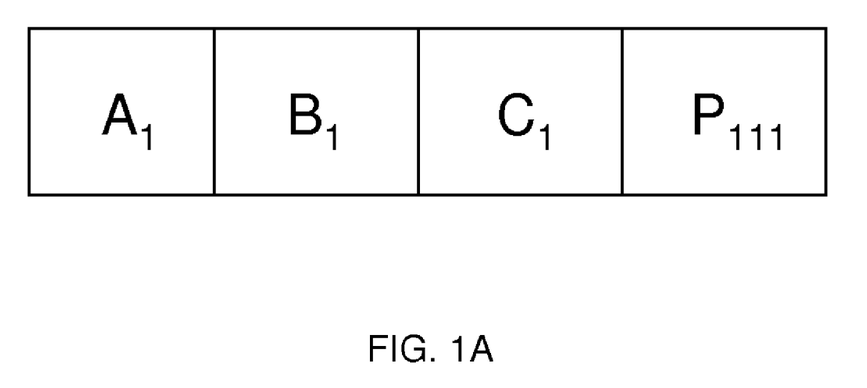
FIG. 1A is a diagram illustrating an example of a RAID stripe having one parity and a set of data disks.
Figure 1B:
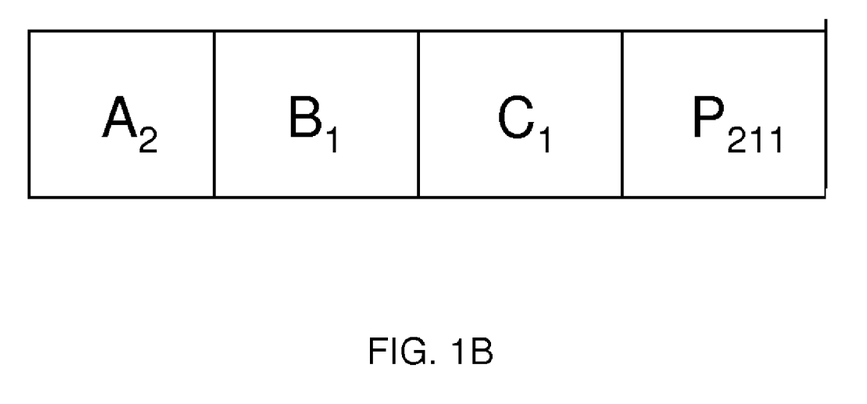
FIG. 1B is a diagram illustrating the state of the stripe of FIG. 1A after a power loss.

In RAID 5, one parity and a set of data disks is provided (ignoring parity rotation for now). The typical one element write is W(A2)→R(A1),R(P111); W(A2),W(P211); WC. The power loss in post-hard break write still causes inconsistent parity for the stripe. While the host knows W(A2) did not complete as an entire operation, it knows nothing of the state of P, which could be P111 or P211, or the data in A, which could be A1 or A2. Thus, if there is a subsequent disk failure, the data recovered into B1 or C1 may be corrupted due to the unknown state of the parity stripe. That is because P111=(A1+B1+C1), and P211=(A2+B1+C1) (here + means XOR), and B1 is recovered by B1=P+A+C1. This requires having P and A be consistent—either P111, A1, or P211, A2. If P111, A2 or P112, A1 is given, the data given for B is corrupt and there is no way of knowing. This is why parity RAID without battery-backed cache is risky, and why an invention is needed when such a cache is not available. Note it is termed a write cache, it doesn't have to be used as a write-back cache. A battery-backed buffer is also provided, since this problem occurs even without write-back caching enabled. Write-back caching is when WC is issued on receipt of W(A2) and there is a promise to complete the write at a later time. This speeds things up dramatically, but again requires battery backup. Referring now to FIG. 1A, a RAID stripe having one parity and a set of data disks is shown. FIG. 1B illustrates the stripe state after a power loss.

SUMMARY

A disk array with redundancy should provide protection against incomplete writes, wherein subsequent disk failures could result in the loss or corruption of other data in the protection group. Such events can occur on an unplanned power loss during a write, resulting in an incomplete protection set, leaving unwritten data at risk. The embodiments of the invention provide a means for protecting against such events without resorting to expensive non-volatile write caches. The protection is provided by a tiny amount of non-volatile memory (e.g., 64 bytes), such as is freely available on most PC motherboards in the battery backed CMOS RAM, in concert with a write log. The downside is an increase in the write IO traffic and bandwidth requirements. However, at the low end of the market, the improved data integrity is worth the tradeoff.

The embodiments of the invention provide methods of protecting data blocks while writing to a storage array, wherein storage units in the storage array include write logs. The data protection level of the write logs is equal to or greater than the data protection level of the storage units. Moreover, the write logs have metadata describing contents of the write logs, wherein the metadata include a sequence number identifying the age of the metadata. Each of the data blocks is a member of a parity group having addressable data blocks and first parity blocks. The addressable data blocks have at least one host data block and at least one associated data block.

A method begins by reading the associated data block and/or the first parity blocks from the parity group; and, writing the associated data block to the write logs. This can include writing a first associated data block to a write log on a storage unit having the host data block. Further, a second associated data block can be written to a write log on a storage unit having a first redundancy block of the first parity blocks. Next, second parity blocks are created from the associated data block.

Following this, the method writes the second parity blocks to the write logs. Specifically, this can include writing a first block of the second parity blocks to a write log on a storage unit having a second redundancy block of the first parity blocks. Further, a second block of the second parity blocks can be written to a write log on a storage unit having a third redundancy block of the first parity blocks.

The method then creates updated first parity blocks from an updated host data block. The updated host data block and updated first parity blocks are written to the storage units. The write logs are subsequently cleared and a write complete indication is issued.

The method can also include, prior to creating the updated first parity blocks, setting an address pointer for the write logs in non-volatile memory, for example, in battery-backed random access memory on a motherboard. The address pointer indicates the location of the write logs. The method can add an error-correcting code to the address pointer. Prior to clearing of the write logs, the method clears the address pointer.

The embodiments of the invention further include a system of protecting data blocks while writing to a storage array, wherein storage units in the storage array have write logs. The data protection level of the write logs is equal to or greater than the data protection level of the storage units. Moreover, the write logs have metadata describing contents of the write logs, wherein the metadata include a sequence number identifying the age of the metadata. Each of the data blocks is a member of a parity group including addressable data blocks and first parity blocks. The addressable data blocks include at least one host data block and at least one associated data block.

The system includes a reader to read the associated data block and/or the first parity blocks from the parity group. Further, a writer is provided to write the associated data block to the write logs. Specifically, the writer can write a first associated data block to a write log on a storage unit having the host data block. Moreover, the writer can write a second associated data block to a write log on a storage unit having a first redundancy block of the first parity blocks.

The system also includes a processor to create second parity blocks from the associated data block, wherein the writer can write the second parity blocks to the write logs. Specifically, the writer can write a first block of the second parity blocks to a write log on a storage unit having a second redundancy block of the first parity blocks. The writer can also write a second block of the second parity blocks to a write log on a storage unit having a third redundancy block of the first parity blocks.

Furthermore, the processor can create updated first parity blocks from an updated host data block. The writer can write the updated host data block and the updated first parity blocks to the storage units. Moreover, the processor can clear the write logs and issue a write complete indication.

In addition, prior to creating the updated first parity blocks, the processor can set an address pointer for the write logs in a non-volatile memory, for example, in battery-backed random access memory on a motherboard. The address pointer indicates a location of the write logs. The processor can also add an error-correcting code to the address pointer, and clear the address pointer prior to the clearing of the write logs.

Accordingly, the embodiments of the invention maintain data integrity without an extensive nonvolatile write cache for low cost systems. In the place of the write cache, write log regions are introduced onto each disk and a very small (~64 bytes) nonvolatile memory is utilized, such as is freely available on PC motherboard in the onboard CMOS RAM. The write log is used to hold intermediate data posted during write operations and the memory is used to hold address information on outstanding dirty logs.

In view of the foregoing, an embodiment of the invention provides a

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

The embodiments of the invention maintain data integrity without an extensive nonvolatile write cache for low cost systems. In the place of the write cache, write log regions are introduced onto each disk and a very small (~64 bytes) nonvolatile memory is utilized, such as is freely available on PC motherboard in the onboard CMOS RAM. The write log is used to hold intermediate data posted during write operations and the memory is used to hold address information on outstanding dirty logs.

Figure 2A:
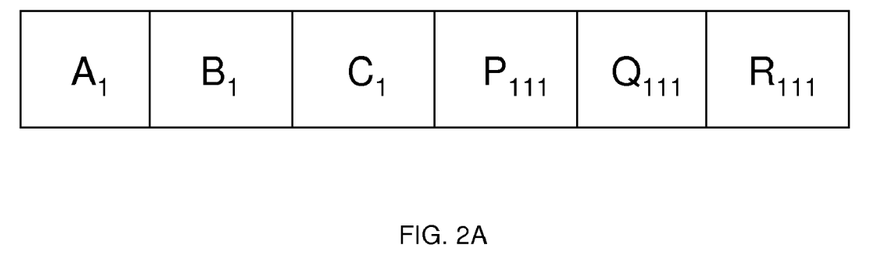
FIG. 2A is a diagram illustrating an example of a stripe for a 3+3 RAID array.

A battery-backed cache for low-end disk arrays may be cost prohibitive for some customers. FIG. 2A illustrates an example of a stripe for a 3+3 RAID array. The notation (A, B, C) represents user data, while (P, Q, R) are the three types of parity. For data, the single subscript indicates the data write number. For parity, the triple subscripts indicate the associated data write number for the A, B and C data, respectively.

W is a disk write operation, R is a disk read operation, and WC signals a write complete to the host. A comma indicates asynchronous operations. A semicolon indicates a hard break, where all preceding operations must complete before the subsequent operations can begin. A write to just one data element, such as $W(A_2)$ will normally translate into the following operations: $W(A_2) \rightarrow R(B_1), R(C_1); W(A_2), W(P_{2111}), W(Q_{2111}), W(R_{2111})$; WC.

The well known incomplete write operation can occur when a power loss happens during the write sequence after the hard break. The write operations are asynchronous, so they can occur in any order.

Figure 2B:
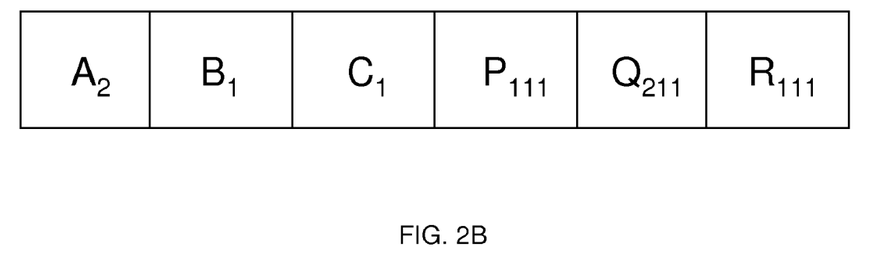
FIG. 2B is a diagram illustrating the state of the stripe of FIG. 1A after a power loss.

For example, after a power loss, the stripe state may be as shown in FIG. 2B. Here, blocks A and Q have been updated, while P and R have not. A write complete has not been returned to the host, so the data in A is indeterminant to the host. However, there is inconsistent parity at this point and unrelated data in B and C if there is a disk failure. There are two common solutions to this situation: ignore it (software RAID), or use a non-volatile cache to hold the write data across the power loss, allowing the write to be completed later. The latter approach works, but requires a sizable non-volatile write cache. At the low end of the market, this may be cost prohibitive.

The write log is designed to have minimal impact on system capacity, and to mitigate the impact on performance. A large number of write logs minimizes the impact. As an example, a disk has 10,000 write logs spaced for uniform performance. A first approximation would be to have them evenly spaced in logical block addressing (LBAs). Therefore, 14 bits are required to specify a log address on an array (the logs are striped across the disks). This means 64 bytes will hold 32 log pointers. This supports 32 outstanding overlapped writes to a set of 6 disks, which is more than sufficient on the low end.

The write log size should be of the size of the largest contiguous write to support. This could be a stripe size. For example, at 128 kB per log consumes 1.28 GB of disk space. On a 500 GB disk, that is only 0.26%, which is easily ignored. The log size and number of logs can be adjusted to suitable values.

There are 3 situations for a 3+3 array: writes to one data type, writes to two data types and writes to 3 data types. The last case is a stripe write, wherein the write log can be bypassed in such cases since the stripe is considered invalid until write complete. Of the first two cases, writes to one data type is the most complex.

A write operation W(A) will occur as follows, where WL is write to log on the disk, Dfs means the dirty flag pointer is set for this stripe, Dfc means the dirty flag is cleared, P(B,C) is the P parity of B and C, and Q(B,C) is the Q parity of B and C (where P and Q are computed as a 2+2 code):

$$W(A_2) \rightarrow R(B_1), R(C_1); WL_A(B_1), WL_P(C_1), WL_Q(P(B_1, C_1)), WL_R(Q(B_1, C_1)); Dfs; W(A_2), W(P_{211}), W(Q_{211}), W(R_{211}); Dfc; WC$$

$WL_x$ means write to log on disk containing x data/parity type for this stripe. The first set of operations is to read the old B and C data followed by a hard break. Next, the log data is written, followed by a hard break. At this point, the target stripe has not been updated, so an abort here is not an issue. While a hard break is shown after reading the old B and C data, it is to be understood that some overlap may be allowed here, since it is clear that a hard break is only required between reading a piece of data and writing data based on it. For example, once R(C1) completes, WLp(C1) can be started without waiting for R(B1) to complete.

Next, the log pointer for the log used is set in the memory. At this point and until the log pointer is cleared, the B and C data will be recovered from the log. It can be seen that B and C can be retrieved from any 3 disk failures, as a 2+2 code of the data in the log plus the original data is provided. Following Dfs (i.e., the dirty flag pointer is set), the information is written to the target disks. However, until Dfc (i.e., the dirty flag is cleared), the stripe is assumed invalid. Once the log pointer is cleared, the data is valid and a write complete can be issued. The operation of Dfs is completed by writing the location of the log to an area in the non-volatile RAM. Dfc is the clearing of this area. The 2+2 code can be computed by the 3+3 engine, just using 0's as one of the data inputs and ignoring the R output.

This approach costs extra IO and bandwidth. The normal case is 6 IOs to complete such a write. Here, that is increased to 10 IOs, and the bandwidth required is also increased by 67%. However, stream writing is not impacted.

In the case of an update spanning 2 data types, the situation is simpler, and the log data is just copies of the single unwritten data to the parties only (only 4 copies of C are needed to handle any loss of 3):

$$W(A_2), W(B_2) \rightarrow R(C_1); WL_P(C_1), WL_Q(C_1), WL_R(C_1); Dfs; W(A_2), W(B_2), W(P_{221}), W(Q_{221}), W(R_{221}); Dfc; WC;$$

The IO penalty is only 9 here, so the performance hit is somewhat less. The base performance of a high efficiency RAID with 3 failure protection is 8 IOs for writes.

The log will also contain metadata about the contents of the log so that it is self-describing. This includes a non-wrapping sequence number to allow the system to identify the most recent log information. The metadata also includes information on the contents, such as the type of data in the log and the set information. For example, the log on the disk holding A data indicates that the write operation is W(A), the target LBA, and that the contents are B1.

To protect against defects in the CMOS RAM, an error-correcting code (ECC), such a Hamming code, can be added to the pointer data, or mirroring the pointer data, or using different coding schemes of the mirrors. There are many choices of ECC, with differing overheads and computational complexity. For example, a Hamming distance of 4 can be achieved by mirroring the data with and using a parity byte on each set. A distance of 4 gives single byte error correction and detection of up to 3 byte errors. Such protection should suffice, and is simple to implement. This leaves 31 bytes for the log pointer. At 14 bits per entry, this allows for 17 entries.

Further, the log operation can be restricted to specific areas or high value data. This approach is applicable to any RAID, not just 3+3. It may be useful in PC-based software RAID systems where performance is not the primary concern.

The performance impact can be somewhat muted by having logs close to data (thus a large number of logs), such that a long seek isn't involved between the log update and the data write. In general, there is still a latency penalty, which can be significant. However, it is possible to construct the log in such a manner as to minimize the latency penalty. Here, an entire disk track (or most of one) is assigned to each write log. Then, the log data is written to the first sector encountered, with metadata indicating which sector is the start of the log. On reading the log, the starting sector with the most recent sequence number is scanned, and a user determines the contents of the log. This approach can effectively eliminate the latency penalty. However, this requires a disk drive that will reorder the writes to a track to minimize the latency. If the disk does not provide such a feature, it can be approximated at the array controller with a model of the rotational position. Then, the log target sectors are adjusted to minimize the latency. The concept of writing to the first sector encountered is detailed in U.S. Pat. No. 6,891,694 to Hetzler, et al. and U.S. Pat. No. 7,010,645 to Hetzler, et al., which are fully incorporated herein by reference.

During power-up, the NV RAM is observed to identify the active write logs. The sequence number helps here since when writing to a given log area, all the disks aren't written to. As seen in equation 1, above, disks (A, P, Q, R) are written to, but not (B, C). It is possible that a prior write (say of B) left old log data in B. Given the sequence number, the most recent log data can be determined. Thus, it is not necessary to keep the log details in the NV RAM. Further, old log entries do not have to be erased when write operations complete, thus reducing the 10 count.

Figure 3:
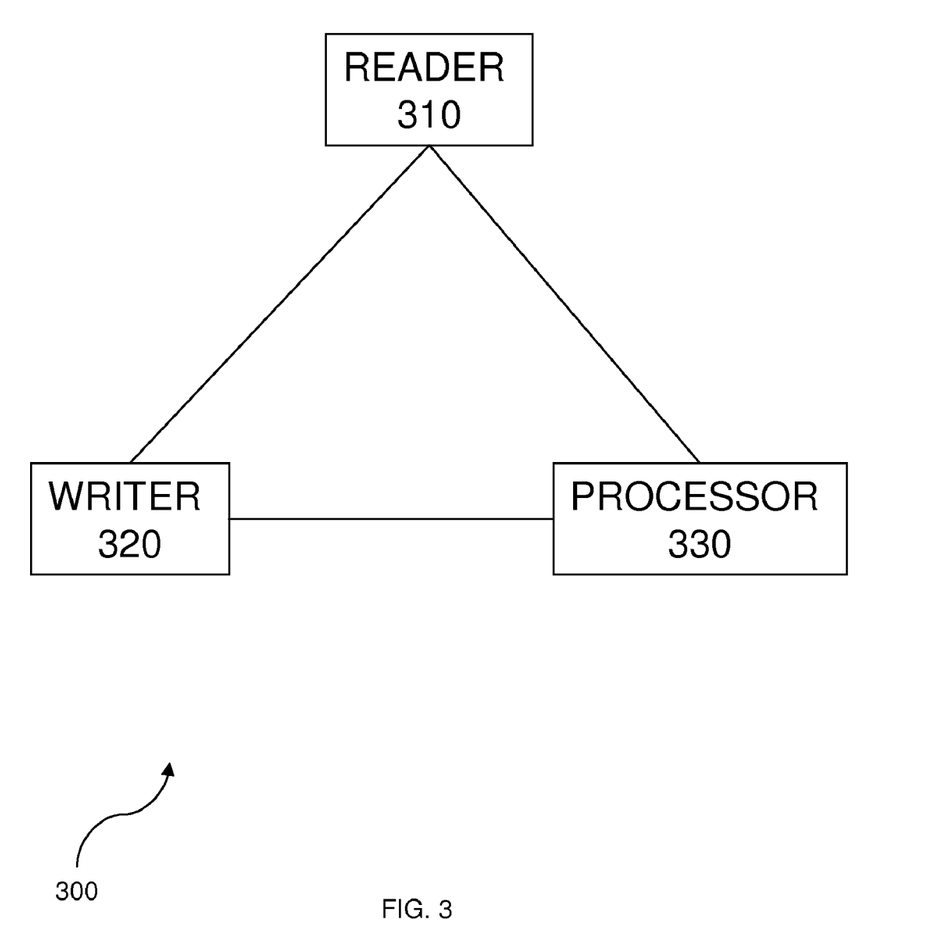
FIG. 3 is a diagram illustrating a system for incomplete write protection for a disk array.

Referring to FIG. 3, a diagram of a system 300 for incomplete write protection for a disk array is shown. The system 300 protects data blocks while writing to a storage array, wherein storage units in the storage array have write logs. The data protection level of the write logs is equal to or greater than the data protection level of the storage units. Moreover, the write logs have metadata describing contents of the write logs, wherein the metadata includes a sequence number identifying the age of the metadata. Each of the data blocks is a member of a parity group comprising addressable data blocks (e.g., A1, B1, C1) and first parity blocks (e.g., P111, Q111, R111). The addressable data blocks include at least one host data block (e.g., A1) and at least one associated data block (e.g., B1, C1).

The system 300 includes a reader 310 to read the associated data block (e.g., B1, C1) and/or the first parity blocks (e.g., P111, Q111, R111) from the parity group. Further, a writer 320 is provided to write the associated data block to the write logs. Specifically, the writer 320 can write a first associated data block (e.g., B1) to a write log on a storage unit having the host data block (e.g., A1). Moreover, the writer 320 can write a second associated data block (e.g., C1) to a write log on a storage unit having a first redundancy block of the first parity blocks (e.g., P).

The system 300 also includes a processor 330 to create second parity blocks (e.g., P(B1, C1) and Q(B1, C1)) from the associated data block, wherein the writer 320 can write the second parity blocks to the write logs. Specifically, the writer 320 can write a first block of the second parity blocks (e.g., P(B1, C1)) to a write log on a storage unit having a second redundancy block of the first parity blocks (e.g., Q). The writer 320 can also write a second block of the second parity blocks (e.g., Q(B1, C1)) to a write log on a storage unit having a third redundancy block of the first parity blocks (e.g., R).

Furthermore, the processor 330 can create updated first parity blocks (e.g., P211, Q211, and R211) from an updated host data block (e.g., A2). The writer 320 can write the updated host data block and the updated first parity blocks to the storage units. Moreover, the processor 330 can clear the write logs and issue a write complete indication.

In addition, prior to creating the updated first parity blocks, the processor 330 can set an address pointer for the write logs in a non-volatile memory, for example, in battery-backed random access memory on a motherboard. The address pointer indicates a location of the write logs. The processor 330 can also add an error-correcting code to the address pointer, and clear the address pointer prior to the clearing of the write logs.

Figure 4:
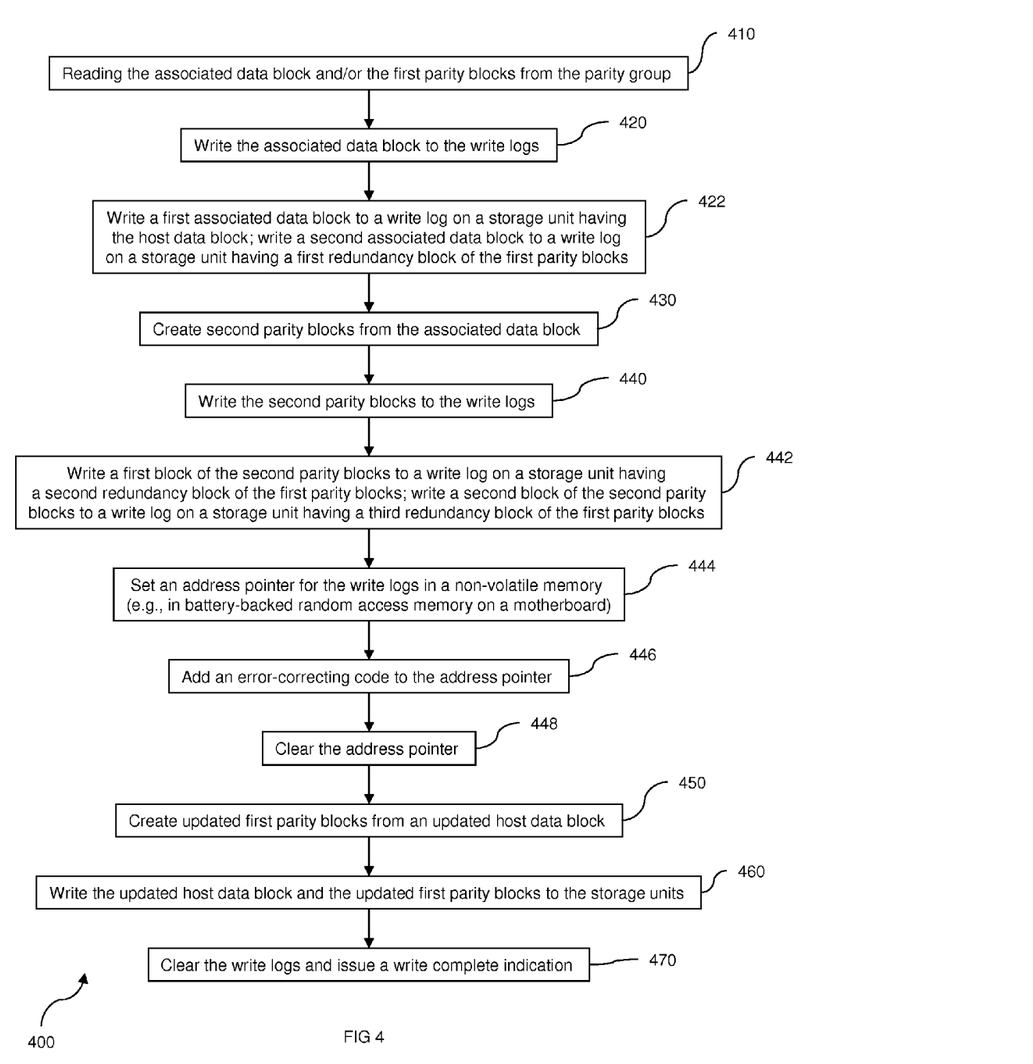
FIG. 4 is a flow diagram illustrating a method of incomplete write protection for a disk array.

FIG. 4 is a flow diagram illustrating a method 400 of incomplete write protection for a disk array. The method 400 protects data blocks while writing to a storage array, wherein storage units in the storage array have write logs. The data protection level of the write logs is equal to or greater than the data protection level of the storage units. Moreover, the write logs have metadata describing contents of the write logs, wherein the metadata includes a sequence number identifying the age of the metadata. Each of the data blocks is a member of a parity group having addressable data blocks (A1, B1, C1) and first parity blocks (P111, Q111, R111). The addressable data blocks include at least one host data block (A1) and at least one associated data block (B1, C1).

The method 400 begins by reading the associated data block (B1, C1) and/or the first parity blocks (P111, Q111, R111) from the parity group (item 410); and, writing the associated data block to the write logs (item 420). In item 422, this can include writing a first associated data block (B1) to a write log on a storage unit having the host data block (A1). Further, a second associated data block (C1) can be written to a write log on a storage unit having a first redundancy block of the first parity blocks (i.e., P). Next, in item 430, second parity blocks (P(B1, C1) and Q(B1, C1)) are created from the associated data block.

Following this, in item 440, the method 400 writes the second parity blocks to the write logs. Specifically, in item 442, this can include writing a first block of the second parity blocks (P(B1, C1)) to a write log on a storage unit having a second redundancy block of the first parity blocks (i.e., Q). Further, a second block of the second parity blocks (i.e., Q(B1, C1)) can be written to a write log on a storage unit having a third redundancy block of the first parity blocks (i.e., R).

In item 450, the method then creates updated first parity blocks (P211, Q211, and R211) from an updated host data block (A2). The updated host data block and the updated first parity blocks are written to the storage units in item 460. The write logs are subsequently cleared and a write complete indication is issued in item 470.

The method 400 can also include, prior to the creating of the updated first parity blocks in item 450, setting an address pointer for the write logs in a non-volatile memory (item 444), for example, in battery-backed random access memory on a motherboard. The address pointer indicates a location of the write logs. In item 446, an error-correcting code can be added to the address pointer. Prior to the clearing of the write logs in item 470, the method 400 can clear the address pointer (item 448).

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
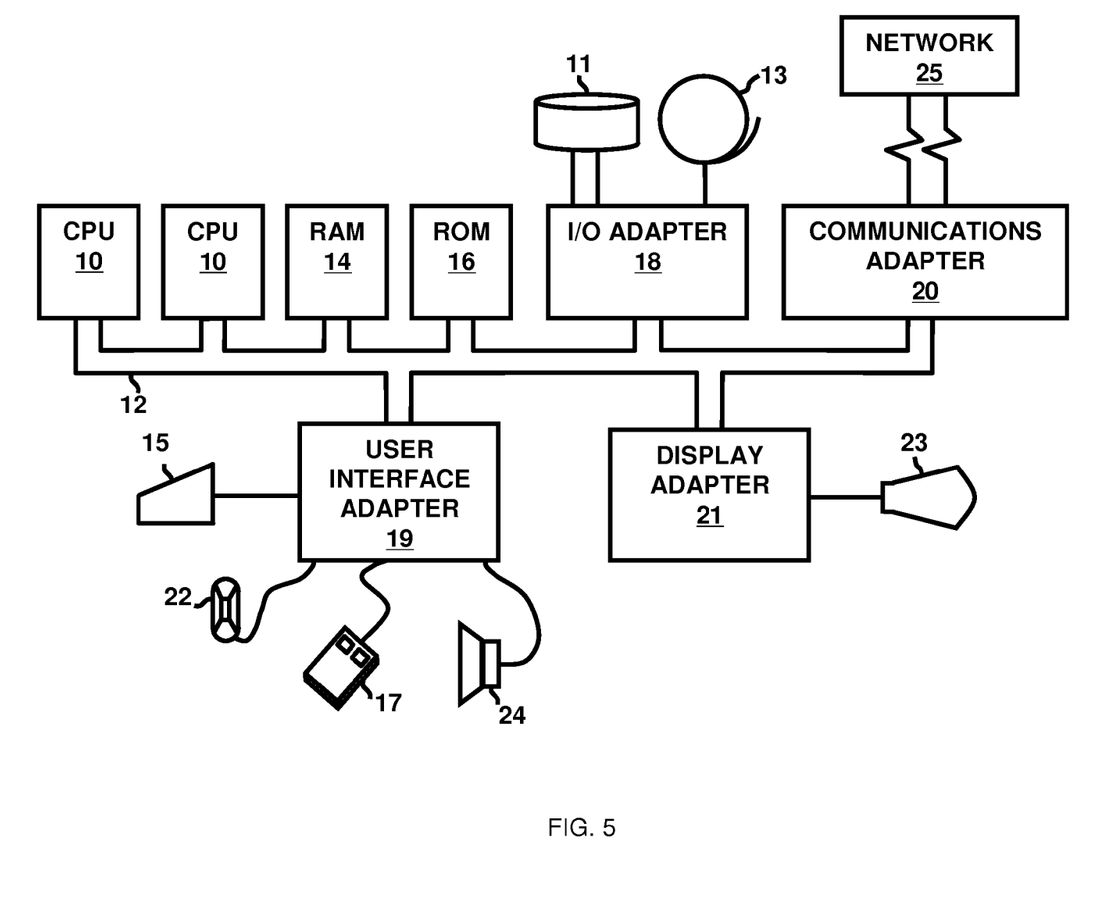
FIG. 5 is a diagram illustrating a computer program product for incomplete write protection for a disk array.

A representative hardware environment for practicing the embodiments of the invention is depicted in FIG. 5. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Accordingly, the embodiments of the invention maintain data integrity without an extensive nonvolatile write cache for low cost systems. In the place of the write cache, write log regions are introduced onto each disk and a very small (~64 bytes) nonvolatile memory, such as is freely available on PC motherboard in the onboard CMOS RAM. The write log is used to hold intermediate data posted during write operations and the memory is used to hold address information on outstanding dirty logs.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A method of protecting data blocks while writing to a storage array, wherein storage units in said storage array comprise write logs, wherein each of said data blocks is a member of a parity group comprising addressable data blocks and first parity blocks, and wherein said addressable data blocks comprise at least one host data block and at least one associated data block, said method comprising:
   reading at least one of said associated data block and said first parity blocks from said parity group using a computer;
   writing said associated data block to said write logs using said computer;
   creating second parity blocks from said associated data block using said computer;
   writing said second parity blocks to said write logs using said computer;
   setting an address pointer for said write logs in a nonvolatile memory such that said address pointer indicates a location of said write logs;
   after setting said address pointer, creating updated first parity blocks from an updated host data block using said computer;
   writing said updated host data block and said updated first parity blocks to said storage units using said computer;
   clearing said address pointer and adding an error-correcting code to said address pointer;
   after clearing said address pointer, clearing said write logs using said computer; and
   issuing a write complete indication using said computer.

2. The method according to claim 1, said setting of said address pointer comprising setting said address pointer in battery-backed random access memory on a motherboard.

3. The method according to claim 1, said writing of said associated data block to said write logs comprising:
   writing a first associated data block to a write log on a storage unit comprising said host data block; and
   writing a second associated data block to a write log on a storage unit comprising a first redundancy block of said first parity blocks.

4. The method according to claim 1, said writing of said second parity blocks to said write logs comprising:
   writing a first block of said second parity blocks to a write log on a storage unit comprising a second redundancy block of said first parity blocks; and
   writing a second block of said second parity blocks to a write log on a storage unit comprising a third redundancy block of said first parity blocks.

5. The method according to claim 1, wherein a data protection level of said write logs is one of equal to and greater than a data protection level of said storage units.

6. The method according to claim 1, said write logs comprising metadata describing contents of said write logs, and wherein said metadata comprises a sequence number identifying an age of said metadata.

7. A system of protecting data blocks while writing to a storage array, wherein storage units in said storage array comprise write logs, wherein each of said data blocks is a member of a parity group comprising addressable data blocks and first parity blocks, and wherein said addressable data blocks comprise at least one host data block and at least one associated data block, said system comprising:
   a reader reading at least one of said associated data block and said first parity blocks from said parity group,
   a writer writing said associated data block to said write logs,
   a processor creating second parity blocks from said associated data block,
   wherein said writer further writes said second parity blocks to said write logs,
   wherein said processor further creates updated first parity blocks from an updated host data block,
   wherein said writer further writes said updated host data block and said updated first parity blocks to said storage units, and
   wherein said processor clears said write logs and issues a write complete indication,
   wherein said processor:
      prior to said creating of said updated first parity blocks, sets an address pointer for said write logs in a nonvolatile memory such that said address pointer indicates a location of said write logs; and
      prior to said clearing of said write logs, clears said address pointer, and
   wherein said processor further adds an error-correcting code to said address pointer.

8. The system according to claim 7, wherein said processor further sets said address pointer in battery-backed random access memory on a motherboard.

9. The system according to claim 7, wherein said writer further:
   writes a first associated data block to a write log on a storage unit comprising said host data block; and
   writes a second associated data block to a write log on a storage unit comprising a first redundancy block of said first parity blocks.

10. The system according to claim 7, wherein said writer further:
   writes a first block of said second parity blocks to a write log on a storage unit comprising a second redundancy block of said first parity blocks; and
   writes a second block of said second parity blocks to a write log on a storage unit comprising a third redundancy block of said first parity blocks.

11. The system according to claim 7, wherein a data protection level of said write logs is one of equal to and greater than a data protection level of said storage units.

12. The system according to claim 7, said write logs comprising metadata describing contents of said write logs, and said metadata comprising a sequence number identifying an age of said metadata.

13. A non-transitory computer readable storage medium comprising computer readable program code stored on computer readable storage medium embodied therein for performing a method of protecting data blocks while writing to a storage array, wherein storage units in said storage array comprise write logs, wherein each of said data blocks is a member of a parity group comprising addressable data blocks and first parity blocks, and wherein said addressable data blocks comprise at least one host data block and at least one associated data block, said method comprising:
   reading at least one of said associated data block and said first parity blocks from said parity group,
   writing said associated data block to said write logs,
   creating second parity blocks from said associated data block,
   writing said second parity blocks to said write logs,
   creating updated first parity blocks from an updated host data block,
   writing said updated host data block and said updated first parity blocks to said storage units,
   clearing said write logs, and
   issuing a write complete indication,
   prior to said creating of said updated first parity blocks, setting an address pointer for said write logs in a non-volatile memory such that said address pointer indicates a location of said write logs; and
   prior to said clearing of said write logs, clearing said address pointer and adding an error-correcting code to said address pointer.

14. The computer program product according to claim 13, further comprising:
   prior to said clearing of said write logs, clearing said address pointer.

15. The computer program product according to claim 13, said writing of said associated data block to said write logs comprising:
   writing a first associated data block to a write log on a storage unit comprising said host data block; and
   writing a second associated data block to a write log on a storage unit comprising a first redundancy block of said first parity blocks.

16. The computer program product according to claim 13, said writing of said second parity blocks to said write logs comprising:
   writing a first block of said second parity blocks to a write log on a storage unit comprising a second redundancy block of said first parity blocks; and
   writing a second block of said second parity blocks to a write log on a storage unit comprising a third redundancy block of said first parity blocks.

17. A method of protecting data blocks while writing to a storage array, wherein storage units in said storage array comprise write logs, wherein each of said data blocks is a member of a parity group comprising addressable data blocks and first parity blocks, and wherein said addressable data blocks comprise at least one host data block and at least one associated data block, said method comprising:
   reading at least one of said associated data block and said first parity blocks from said parity group,
   writing said associated data block to said write logs,
   creating second parity blocks from said associated data block,
   writing said second parity blocks to said write logs,
   creating updated first parity blocks from an updated host data block,
   writing said updated host data block and said updated first parity blocks to said storage units,
   clearing said write logs,
   issuing a write complete indication,
   adding an error-correcting code to said address pointer;
   prior to said creating of said updated first parity blocks, setting an address pointer for said write logs in a non-volatile memory such that said address pointer indicates a location of said write logs;
   prior to said clearing of said write logs, clearing said address pointer,
   wherein said setting of said address pointer comprises setting said address pointer in battery-backed random access memory on a motherboard,
   wherein a data protection level of said write logs is one of equal to and greater than a data protection level of said storage units, and
   wherein said write logs comprise metadata describing contents of said write logs, and wherein said metadata comprises a sequence number identifying an age of said metadata.

* * * * *